Patented Mar. 1, 1932

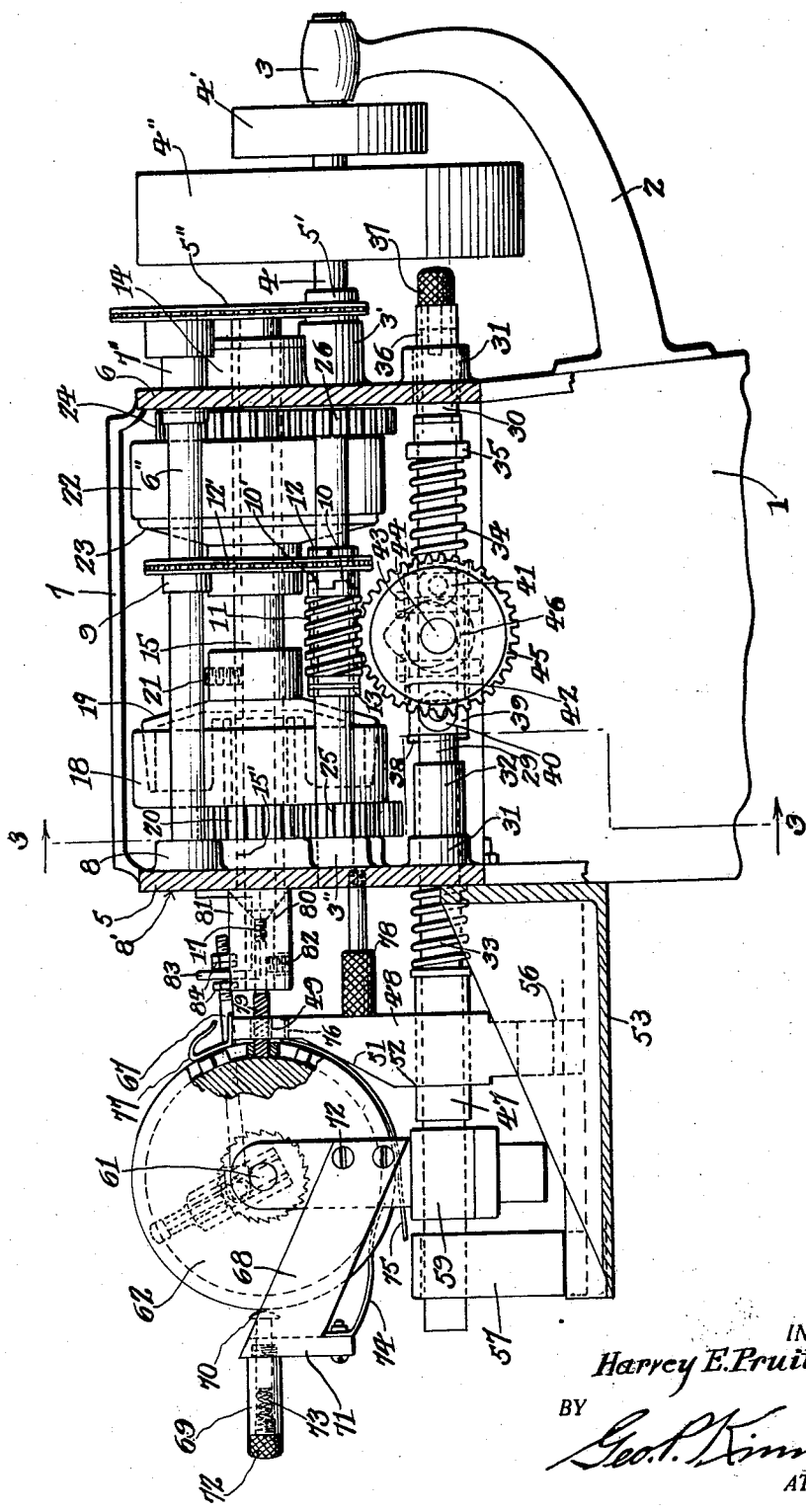

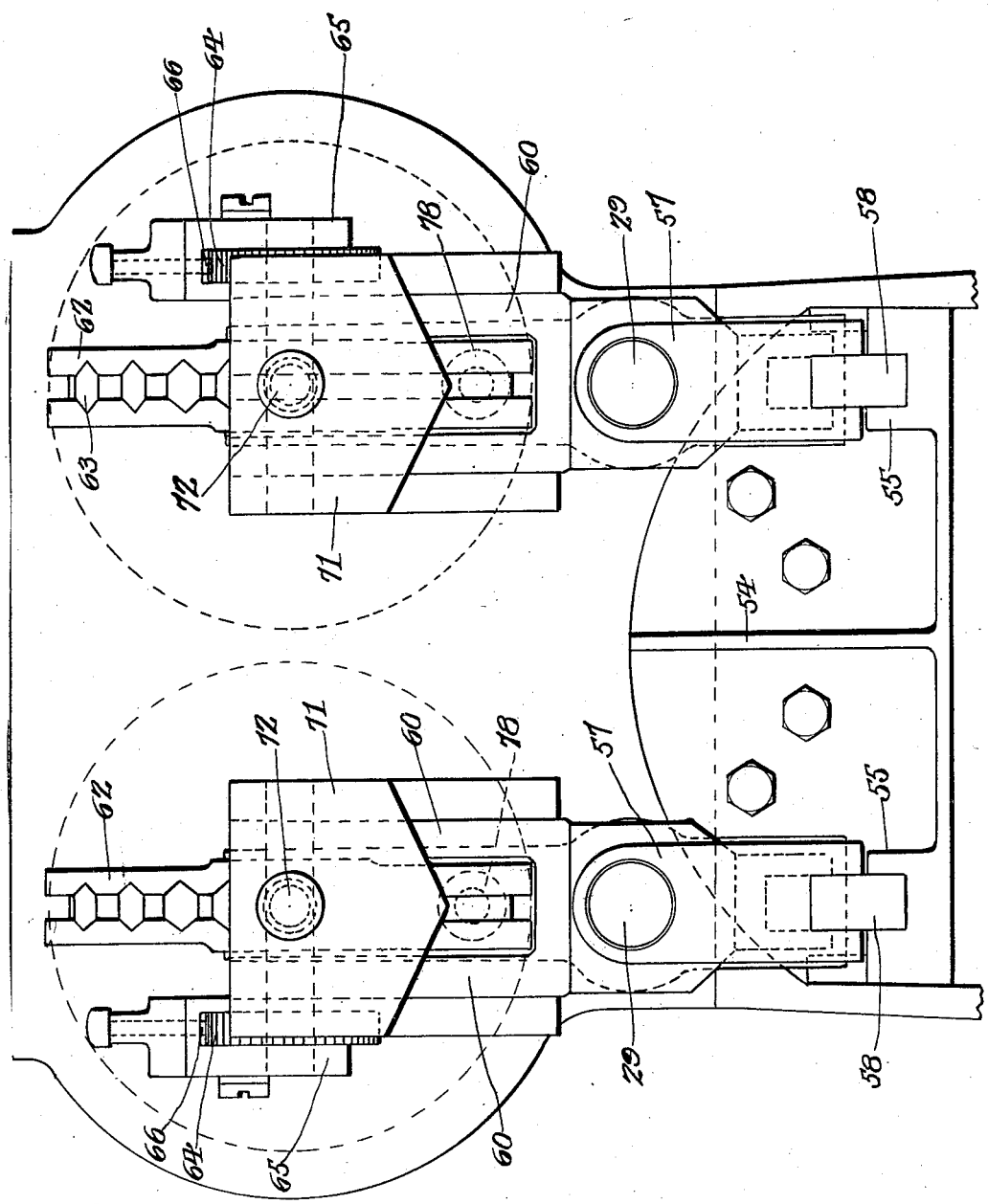

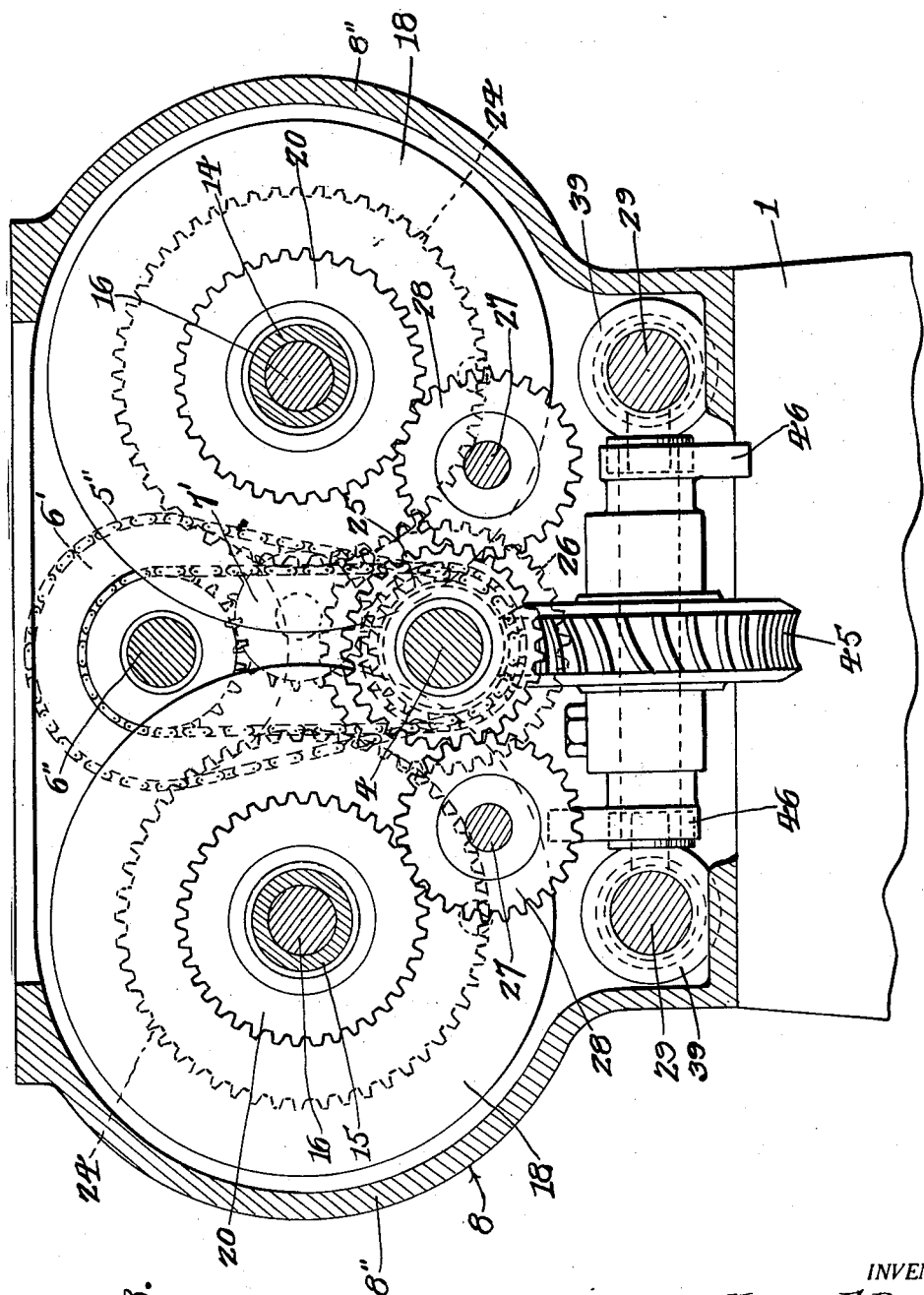

1,847,979

UNITED STATES PATENT OFFICE

HARVEY E. PRUITT, OF FLINT, MICHIGAN

NUT TAPPING MACHINE

Application filed July 7, 1930. Serial No. 466,249.

This invention relates to a nut tapping machine, and has for its object to provide, in a manner as hereinafter set forth, a machine of such class for expeditiously tapping nuts and for the automatic discharge of the tapped nuts during the tapping operation.

A further object of the invention is to provide, in a manner as hereinafter set forth, a nut tapping machine including a pair of simultaneously operated tapping means operated from a common source and providing for simultaneously tapping a pair of nuts, under such conditions increasing output.

A further object of the invention is to provide, in a manner as hereinafter set forth, a nut tapping machine including means whereby a pair of nuts are simultaneously tapped and after being tapped automatically discharged during the tapping operation of subsequent successive blind nuts positioned to be tapped.

Further objects of the invention are to provide, in a manner as hereinafter set forth, a nut tapping machine which is comparatively simple in its construction and arrangement, strong, durable, compact, thoroughly efficient and convenient in its use, readily assembled and comparatively inexpensive to manufacture.

With the foregoing and other objects in view the invention consists of the novel construction, combination and arrangement of parts, as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation, partly in section, of a nut tapping machine in accordance with this invention.

Figure 2 is an end view looking toward that end of the machine from which the tapped nuts are discharged.

Figure 3 is a section on line 3—3, Figure 1.

Referring to the drawings, 1 denotes a vertical support or base, 2 a rearwardly extending bearing support and 3 a bearing carried by the support 2 for the read end of the main drive shaft 4. Connected to the base 1 is an upstanding housing including a front wall 5 and a rear wall 6. The top of the housing is provided with an opening 7. The wall 6 is provided with a bearing 3' for the shaft 4. The bearing 3' projects rearwardly of the wall 6. The wall 5 has its inner face provided with a bearing 3'' for the forward end of shaft 4. The support 2 projects a substantial distance rearwardly from the base 1 and includes an upstanding part which is disposed in parallel spaced relation with respect to wall 6.

Carried by the shaft 4 and interposed between bearing 3' and bearing 3 is a compound pump pulley 4' and a power drive pulley 4''. The shaft 4 rearwardly of the bearing 3' carries a drive sprocket 5' which is connected by a belt 5'' to a sprocket 6' carried on the rear end of a jack shaft 6''. An idle sprocket 7' is employed for maintaining the endless belt or chain 5'' taut. The diameter of the sprocket 6' is greater than the diameter of the sprocket 5'.

A bearing 7'' is carried by the wall 6, projects rearwardly therefrom, and also forwardly. The bearing 7'' is employed for the jack shaft 6''. The wall 5 has projecting from its inner face a bearing 8 for the forward end of jack shaft 6''. The shafts 4 and 6'' are arranged in superposed relation and disposed above and below and in alignment with the longitudinal center of the housing, which is referred to generally at 8' and is formed with oppositely extending curved side walls 8''. The side walls 8'' curve away from the base 1.

Mounted on the jack shaft 6'' is a center sprocket 9 which is arranged in superposed relation with respect to a worm sprocket 10 carried by shaft 4. Mounted on the shaft 4 and operating independently with respect thereto is a worm 11. The sprocket 10 and worm 11 have milled portions as at 10' and which coact to connect the worm 11 to the sprocket 10. A collar 12 is fixed to shaft 4 to prevent the rearward shift of sprocket 10, the latter loosely mounted on the shaft 4 and driven from sprocket 9 by an endless chain or belt 12'. A thrust bearing 13 is secured to shaft 4 at the forward end of worm 11.

The machine includes a pair of spaced spindles, disposed longitudinally thereof, arranged in parallel spaced relation and indicated at 14, 15. The spindles 14, 15 are arranged below jack shaft 6'', above the main drive shaft 4 and each spindle is positioned to one side of said shaft. Each of the spindles is hollow. Each spindle has a rear bearing and which is indicated at 14'. Each spindle has a forward bearing and which is indicated at 15'. Each spindle has associated parts which coact for the purpose of tapping the nuts. The associated parts in connection with but one spindle will be described, as the description of one will apply to the other.

Extending through each spindle is a rod 16. The rod 16 projects from the forward end of its spindle and has a reduced threaded extension 17. Associated with each spindle is a front and a rear clutch. The clutches are oppositely disposed relatively to each other. The front clutch includes a pair of clutching members 18, 19, the latter extending in and adapted to frictionally engage the inner face of the former. The member 18 is loosely mounted on the spindle and has connected thereto a driving gear 20 therefor. The member 19 is fixed to the spindle and the bar 16 as indicated at 21. The member 19 when clutched to the member 18 provides for the rotating of the rod or bar 16 and spindle simultaneously. The front clutch drives the spindle in one direction and the rear clutch in an opposite direction. The rear clutch includes a pair of clutching members 22, 23, the latter being adapted to frictionally engage with the former. The member 22 is loosely mounted on the spindle and is provided with a driving gear 24. The member 23 is fixed to the spindle and the rod or bar 17 whereby said rod or bar and spindle will simultaneously rotate when the member 23 is clutched to the member 22.

Carried by the shaft 4 are spaced sprockets or gears 25, 26, the former being of greater diameter than the latter. See Figure 3. A pair of shafts arranged in spaced relation and in parallelism are connected to and disposed lengthwise of the housing and arranged below the shaft 4 and adjacent each side of the latter. The said shafts are arranged below the spindles and indicated at 27. Each shaft 27 is provided with a sprocket 28, which meshes with a gear 20 and a gear 25. The gear 26 meshes with the gears 24. By this arrangement the clutching members 18, 22, as they are loosely mounted on a spindle are revolved from shaft 4 whereby when clutching member 19 is in clutching engagement with member 18 the spindle will be driven in one direction and when clutching member 23 is in clutching engagement with member 22 the spindle will be driven in the opposite direction.

Associated with each spindle and arranged below the latter is a cam rod 29 having a reduced rear end 30. The rod 29 extends through bosses 31 and projects a substantial distance forwardly of the wall 5 of the housing 8'. The rod 29 also extends beyond the rear wall 6 but not to the extent that it projects forwardly of front wall 5. A bushing 32 is provided for the rod 29. The bushing 32 is arranged in proximity to the wall 5 of the housing. Carried by the rod 29 and arranged forwardly of the wall 5 is a front compression spring 33. Carried by the rod 29 and arranged forwardly of the wall 6 is a rear compression spring 34. Mounted on rod 29 is a stop 35 for the rear compression spring 34. Positioned on the reduced end 30 of the rod 29 and projecting rearwardly from boss 31 on wall 6 is a bushing 36 which abuts the stop 35. Carried by the reduced end 30 of rod 29 and bearing against the bushing 36 is an adjusting screw 37 for the rear compression spring 34.

Extending through the rod 29 is a placement pin 38 against which abuts one end of a roller guide 39 which is mounted on rod 29. The other end of guide 39 has abutting thereagainst the forward end of spring 34. Carried by the guide 39 is a front and a rear cam actuated roller 40, 41 respectively arranged in spaced relation.

Positioned below the worm 11 is a bearing block 42 maintained in position by holddown bolts 43. Journaled in said bearing block and disposed transversely with respect to the housing is a cam axle 44 provided with a worm gear 45 which meshes with the worm 11 and is driven from the latter. The cam axle 44 is also provided with a pair of cams 46 and each of which is arranged to operate between a pair of rollers 40, 41. The cams 46 are oppositely disposed with respect to each other. Each cam is adapted to alternately bear against its associated rollers 40, 41.

The rod 29 forwardly of the wall 5 is provided with a bushing 47 and interposed between the rear end of the latter and the wall 5 is front compression spring 33. The rod 29 extends through a face plate 48 which is vertically disposed and has an opening 49 in proximity to its upper end. The upper part of the front of plate 48 is perpendicular, as indicated at 50. The plate 48 at the lower end of the part 50 has its forward face extend at an outward inclination as at 51 and which terminates into a vertical portion 52. Secured to the housing 8', positioned against base 1 and projecting forwardly from the latter is a feed mechanism support 53 provided with a center brace 54. The support 53 is formed with grooves slide-ways 55 and each face plate 48 has its lower portion provided with a tongue 56 which depends into a groove of a slideway.

The forward end of the rod 29 is mounted in a bearing block 57 having a tongue 58 for engagement with the groove of the slideway 55. Carried by the rod 29 between the bushing 47 and the bearing block 57 is a magazine holder 59 formed with an upstanding pair of spaced, parallel arms 60 in which is mounted a magazine axle 61.

Mounted on the axle 61 is a circular magazine 62 having its edge formed with spaced, polygonal shaped sockets 63 to receive the blind nuts to be tapped. The axle 61 is extended at one end, and fixed to said extended end is a ratchet gear 64. Loosely mounted on said extended end of the axle 61 is a yoke 65 carrying a pin 66 which coacts with the ratchet 64 for the purpose of intermittently rotating axle 61 on the shift of the yoke 65 in opposite directions relatively to axle 61. The yoke 65 is shifted by a pull bar 67 and the pulling means for the latter will be presently referred to.

Secured to and projecting forwardly from the arms 60 and disposed at an upward inclination with respect to the latter is a locating bracket 68 carrying at its forward end a holder 69 for a ball pin 70, the latter projecting rearwardly from the forward end of bracket 68. Holdfast devices 72 are employed for securing bracket 68 to the arms 60. The holder 69 is positioned at the top of the forward end 70 of the bracket 68. The pin 70 which is termed a locating ball pin is spring controlled and the holder 69 carries an adjustable tensioning means 72 for the controlling spring 73 for the pin 70. Secured to the bottom of the forward end 71 of the bracket 68 and projecting rearwardly therefrom is an extract 74. Interposed between the bottom of the magazine 62 and the forward face of the face plate 48 is a combined guide shoe and chute 75 which is fixed at its upper end by the holdfast device 76 to the reduced upper portion of the plate 48. Secured upon the top of the plate 48 and opposing the magazine 62 is an upper guide shoe 77.

Secured to the front wall 5 of the housing and extending toward plate 48 is a feed stop 78, which is adjustable.

A tap is indicated at 79 and operates through the opening 49 for tapping a blind nut. The shank of the tap 79 extends into an adapter 80 and the latter is formed with internal threads to engage the threads on the extension 17 formed on the bar or rod 16 whereby the adapter is coupled to such rod or bar. Encompassing the adapter 80 is a tap holder 81 and the latter, adapter 80 and tap 79 are detachably secured together by a set screw 82. The tap holder 81 abuts the forward face of wall 5 of housing 8'.

Fixedly secured to the wall 5 of the housing 8' and extending forwardly therefrom is a supporting bracket for the pull or draw bar 67 and such bracket is indicatd at 83 and is in the form of an inverted yoke. The forward end of the bracket has the bar 67 extend therethrough and adjusting nuts 84 are mounted on the rear end of the bar 67, such rear end being threaded, and the nuts are arranged rearwardly and forwardly with respect to the forward arm of bracket 83.

Each magazine holder 60 is clamped to its associated cam rod 29. The feed stops 78 are adjustable. The front bearing block 57 provides a steady end rest for the shaft 29.

The operation of the machine with respect to the spindle 15 and its associate parts in Figure 1, is that the pulley 4″ is driven by a suitable means and which in turn operates the shaft 4. The drive connections 5′, 5″ and 6′ between shafts 4 and 6″ will provide for the operation of the shaft 6″. The drive connections 9 and 12′ leading from shaft 6″ will provide for the driving of the gear 12 which in turn will operate the worm 11 about the shaft 4. The worm 11 will operate the worm gear 45, the latter and cam axle 44 will drive cams 46.

A cam 46 when turned to the left forces the roller guide 39 by means of roller 41 rearwardly of compression spring 34, until compression spring stop 35 engages the wall 6 of the housing. Before stop 35 reaches wall 6 of the shoulder on shaft 29 abuts bushing 36 and forces it against compression spring adjusting screw 27 thereby forcing shaft 29 toward the back of the machine carrying magazine 62 therewith toward tap 79. As tap 79 strikes a blind nut in socket 63 the pressure caused by this contact forces the spindle 15 toward the back of the machine, but as spindle 15 is forced toward the back of the machine, the clutching member 23 engages with clutching member 22 thereby providing for the operation of spindle 15 and tap 79 to enter blind nut. The magazine 62 is mounted on holder 59 by means of the magazine axle 61 and carries the face plate 48 therewith on the tapping operation, compressing front compression spring 33 as face plate 48 slides on the bushing 47. The tongue at the lower end of face plate 48 maintains the latter in an upright position. The depth of the tap hole in the nut is determined by the setting of the feed stop 78, which allows base plate 48 to go only as far as the forward end of the stop 78, therefore the base plate in turn allows the magazine 62 to feed the tap 79 only to the desired depth. When the roller 41 has passed the high point of cam 46, the rear compression spring 34 releases its tension and forces roller guide 39 toward the front of the machine until it meets placement pin 38, which, being fixed to rod 29 forces the latter toward the front of the machine and carries the magazine 62 away from tap 79. At the first bit of tension of magazine 62 pulling away from tap 79, clutching member 19 engages with clutching member 18 operating spindle 15 in a direction to back the tap 79 out of nut, immediately after tap 79 leaves the nut, cam 46 rotates forwardly, striking roller 40 at the high point of the cam giving slight forward movement of rod 29 causing the yoke 65 to shift, through action of draw or pull bar adjusting nuts 84 being stopped by the forward arm of draw bar bracket 83. The shifting of yoke 65 causes pin 66 to jump a tooth on ratchet gear 64. The ratchet gear is secured with the magazine 62 and the latter is rotated a circular distance of the center to center distance between each blind nut in the magazine 62. This sets another blind nut in place to be tapped.

The locating ball pin 70 acts as a snap stop and the magazine 62 indexes itself for the next nut by the ratchet gear 64 and pin 66.

The guide shoe 77 and the combined guide shoe and chute 75 to keep the nuts from falling out of the magazine and the extractor 74 provides for positive extraction of the nuts when they reach the end of the combined shoe and chute 75.

The internal threads on the adapter 80 enable for extracting tap 79 without removing feed mechanism. When screws 21 and 82 are released the adapter, tap and rod 16 can be pulled out of spindle through back end thereof.

The operation referred to applies to one feeding and one tapping mechanism, but the operation in connection with the other feeding and tapping mechanisms will be the same as that described, as the said other tapping and feeding mechanism are also operated from shafts 4 and 6″, worm 11, worm gear 45 and a cam 46. The cam axle 44 is of a length to position the cams 46 between the pair of cam rollers for each rod 29.

It is thought the many advantages of a nut tapping machine, in acordance with this invention can be readily understood, and although the preferred embodiment of the invention is as illustrated and described, yet it is to be understood that changes in the details of construction can be had which fall within the scope of the invention as claimed.

What I claim is:

1. In a nut tapping machine of that type including a tapper device, the combination of a bodily shiftable, intermittently rotatable nut magazine for successively positioning the work to be acted upon by the tapper device, a spring controlled, lengthwise shiftable rod for supporting and bodily moving said magazine toward and from the tapper device, means for shifting said rod in opposite directions, a cam for actuating said means, operating mechanism for said cam, a drive means for said operating mechanism, a slidable face plate having a reduced upper portion interposed between said magazine and tapper device and through which extends the tapper, said face plate having an intermediate portion having an inclined front face opposing said magazine and a lower portion formed with an opening for the passage of said rod, and a guide shoe on the top of said plate bearing against said magazine.

2. In a nut tapping machine of that type including a tapper device, the combination of, a bodily shiftable, intermittently rotatable nut magazine for successively positioning the work to be acted upon by the tapper device, a spring controlled, lengthwise shiftable rod for supporting and bodily moving said magazine toward and from the tapper device, means for shifting said rod in opposite directions, a cam for actuating said means, operating mechanism for said cam, a drive means for said operating mechanism, a slidable face plate interposed between said magazine and tapper device and through which extends the tapper device, said face plate having said rod extend therethrough, and a spring controlled locating device for said magazine for releasably maintaining it in position to present the work to be acted upon by the tapper device.

3. In a nut tapping machine of that type including a tapper device, the combination of, a bodily shiftable, intermittently rotatable nut magazine for successively positioning the work to be acted upon by the tapper device, a spring controlled, lengthwise shiftable rod for supporting and bodily moving said magazine toward and from the tapper device, means for shifting said rod in opposite directions, a cam for actuating said means, operating mechanism for said cam, a drive means for said operating mechanism, a slidable face plate interposed between said magazine and tapper device and through which extends the tapper device, said face plate having said rod extend therethrough, a spring controlled locating device for said magazine for releasably maintaining it in position to present the work to be acted upon by said tapper device, a combined guide shoe and chute connected to the face plate and interposed therebetween and said magazine, and an extractor projecting toward said face plate and interposed between the magazine and said combined guide shoe and chute.

4. In a nut tapping machine of that type including a tapper device, the combination of, a bodily shiftable, intermittently rotatable nut magazine for successively positioning the work to be acted upon by the tapper device, a spring controlled, lengthwise shiftable rod for supporting and bodily moving said magazine toward and from the tapper device, means for shifting said rod in opposite directions, a cam for actuating said means, operating mechanism for said cam, a drive means for said operating mechanism, a slidable face plate interposed between said magazine and tapper device and through which extends the tap of the tapper device, said face plate having said rod extending therethrough, a spring controlled locating device for said magazine for releasably maintaining it in position to present the work to be acted upon by the tapper device, supporting shiftable means for said rod, and means connected with said magazine and with said tapper device for intermittently rotating said magazine on the shift of said rod in one direction.

5. A nut tapping machine comprising a rotatable, lengthwise shiftable element, a tapper device connected to one end of said element and shifted rearwardly by a blind nut moving to a position to be tapped for bodily shifting said element in one direction, said tapper device bodily shifting with said element when the latter is shifted in the opposite direction, spaced, alternative driven, normally inactive clutching devices mounted on said element and selectively controlled for operation by the lengthwise shifting of the latter in opposite directions for alternately rotating element in opposite directions when said devices are alternately active, each of said clutching devices including a fast and a loose member, the latter having as a permanent part thereof a driving gear therefor, a bodily shiftable, intermittently rotatable nut magazine for successively positioning the work to be acted upon by said tapper device and providing for bodily shifting said element in a direction opposite that in which the element is shifted by said tapper device, a spring controlled, lengthwise shiftable rod supporting and for bodily moving said magazine toward and from said tapper device, means for shifting said rod in opposite directions, a cam for actuating said rod shifting means, an operating shaft, gear drive connections between said operating shaft and the gears of said clutch gears, and gear drive connection between said operating shaft and said cam.

6. A nut tapping machine comprising a rotatable, lengthwise shiftable element, a tapper device connected to one end of said element and shifted rearwardly by a blind nut moving to a position to be tapped for bodily shifting said element in one direction, said tapper device bodily shifting with said element when the latter is shifted in the opposite direction, spaced, alternative driven, normally inactive clutching devices mounted on said element and selectively controlled for operation by the lengthwise shifting of the latter in opposite directions for alternately rotating element in opposite directions when said devices are alternately active, each of said clutching devices including a fast and a loose member, the latter having as a permanent part thereof a driving gear therefor, a bodily shiftable, intermittently rotatable nut magazine for successively positioning the work to be acted upon by said tapper device and providing for bodily shifting said element in a direction opposite that in which the element is shifted by said tapper device, a spring controlled, lengthwise shiftable rod supporting and for bodily moving said magazine toward and from said tapper device, means for shifting said rod in opposite directions, a cam for actuating said rod shifting means, an operating shaft, gear drive connections between said operating shaft and the gears of said clutch gears, a gear drive connection between said operating shaft and said cam, and a slidable face plate interposed between said magazine and tapper device and through which extends said tapper device.

7. A nut tapping machine comprising a rotatable, lengthwise shiftable element, a tapper device connected to one end of said element and bodily shifting said element in one direction and bodily shifting with said element when the latter is shifted in the opposite direction, clutching devices mounted on said element for alternately rotating it in opposite directions when said devices are alternately active and each having a gear as a part thereof, a bodily shiftable, intermittently rotatable nut magazine for successively positioning the work to be acted upon by said tapper device and providing for bodily shifting said element in a direction opposite that in which the element is shifted by said tapper device, a spring controlled, lengthwise shiftable rod supporting and for bodily moving said magazine toward and from said tapper device, means for shifting said rod in opposite directions, a cam for actuating said rod shifting means, an operating shaft, gear drive connections between said operating shaft and said clutch gears, a gear drive connection between said operating shaft and said cam, a slidable face plate interposed between said magazine and tapper device and through which extends said tapper device, a spring controlled holder device engageable with said magazine for maintaining it in position to present the work to the tapper device, a combined shoe and chute carried by the face plate and interposed between the latter and said magazine, and an extractor projecting from said holder device and interposed between said combined shoe and chute and magazine.

8. A nut tapping machine comprising a rotatable, lengthwise shiftable element, a tapper device connected to one end of said element and bodily shifting said element in one direction and bodily shifting with said element when the latter is shifted in the opposite direction, clutching devices mounted on said element for alternately rotating it in opposite directions when said devices are alternately active and each having a gear as a part thereof, a bodily shiftable, intermittently rotatable nut magazine for successively positioning the work to be acted upon by said tapper device and providing for bodily shifting said element in a direction opposite that in which the element is shifted by said tapper device, a spring controlled, lengthwise shiftable rod supporting and for bodily moving said magazine toward and from said tapper device, means for shifting said rod in opposite directions, a cam for actuating said rod shifting means, an operating shaft, gear drive connections between said operating shaft and said clutch gears, and a gear drive connection between said operating shaft and said cam, said face plate being shifted by said magazine, and an adjustable stop for limiting the shift of the face plate by the magazine.

In testimony whereof, I affix my signature hereto.

HARVEY E. PRUITT.